United States Patent
Chu et al.

(10) Patent No.: US 7,392,017 B2
(45) Date of Patent: Jun. 24, 2008

(54) ASSESSING WIRELESS NETWORK QUALITY

(75) Inventors: Michael Chu, Los Altos Hills, CA (US); Mark Crady, Palo Alto, CA (US); Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/172,377

(22) Filed: Jun. 30, 2005

(65) Prior Publication Data

US 2007/0004394 A1 Jan. 4, 2007

(51) Int. Cl.
*H04B 17/00* (2006.01)

(52) U.S. Cl. ............... 455/67.11; 455/423; 455/434; 455/456.2; 455/515; 370/241.1; 370/245; 370/248; 370/253

(58) Field of Classification Search .......... 455/423, 455/424, 434, 435, 446, 503, 515, 67.11, 455/67.13, 67.14; 370/241.1, 245, 248, 253
See application file for complete search history.

(56) References Cited

U.S. PATENT DOCUMENTS

| | | | |
|---|---|---|---|
| 5,490,204 A | 2/1996 | Gulledge | |
| 5,644,623 A | 7/1997 | Gulledge | |
| 5,799,154 A | 8/1998 | Kuriyan | |
| 5,983,185 A | 11/1999 | Cuffaro et al. | |
| 6,157,830 A | 12/2000 | Minde et al. | |
| 6,219,544 B1 | 4/2001 | Suutarinen | |
| 6,236,949 B1 * | 5/2001 | Hart | 702/64 |
| 6,285,875 B1 | 9/2001 | Alajoki et al. | |
| 6,438,373 B1 * | 8/2002 | Gulledge et al. | 455/423 |
| 6,516,189 B1 | 2/2003 | Frangione et al. | |
| 6,603,966 B1 | 8/2003 | Sheffield | |
| 6,609,001 B2 | 8/2003 | Kline et al. | |
| 6,711,404 B1 | 3/2004 | Arpee et al. | |
| 6,721,557 B1 | 4/2004 | Ritter | |
| 6,775,549 B2 | 8/2004 | Benveniste | |
| 6,778,823 B2 | 8/2004 | Adam et al. | |
| 6,810,246 B1 | 10/2004 | Kalofonos et al. | |
| 6,816,727 B2 * | 11/2004 | Cox et al. | 455/414.1 |
| 2002/0177448 A1 * | 11/2002 | Moran et al. | 455/456 |
| 2003/0120753 A1 * | 6/2003 | Ebert | 709/219 |
| 2004/0204063 A1 * | 10/2004 | Van Erlach | 455/556.1 |
| 2005/0064870 A1 * | 3/2005 | Gabara et al. | 455/438 |
| 2005/0080563 A1 * | 4/2005 | Petrovski et al. | 701/213 |
| 2005/0136949 A1 * | 6/2005 | Barnes, Jr. | 455/461 |
| 2006/0223546 A1 * | 10/2006 | Claussen | 455/456.1 |
| 2006/0239266 A1 * | 10/2006 | Babbar et al. | 370/392 |
| 2007/0088819 A1 * | 4/2007 | Sinha | 709/224 |

\* cited by examiner

*Primary Examiner*—Joseph Feild
*Assistant Examiner*—Inder Pal Mehra
(74) *Attorney, Agent, or Firm*—Fish & Richardson P.C.

(57) ABSTRACT

A method of providing information indicative of network coverage by one or more wireless service providers in a geographic area may include obtaining, at an information provider, performance indicators for a plurality of accesses to the information provider by a plurality of wireless devices. The performance indicators may be correlated with one or more network service areas. Related performance indicators may be aggregated to produce one or more aggregated performance indicators. A human-discernible representation of network performance for one or more network service areas may be produced.

25 Claims, 15 Drawing Sheets

| Communication ID 501 | Device ID 504 | Date/Time Stamp 507 | GPS Coordinates 510 | Region 513 | Wireless Service Provider 516 | Wireless Device Model 519 | Retries 522 | Dropped? 525 |
|---|---|---|---|---|---|---|---|---|
| 231A | 5326 | 04-24-2005 14:03:01 | (44.92497, -93.40018) | Region 225E | Sprint (219) | Motorola V60v | 3 | N |
| 231B | 5326 | 04-24-2005 14:03:48 | (44.93628, -93.40644) | Region 225B | Sprint (219) | Motorola V60v | 0 | N |
| 231C | 5326 | 04-24-2005 14:04:37 | (44.94395, -93.41267) | Region 225B | Sprint (219) | Motorola V60v | 0 | N |
| 234 | 4619 | 04-24-2005 14:04:39 | | Region 225E | Sprint (219) | Nokia 6016i | 5 | Y |
| ... | | | | | | | | |
| 237 | 5326 | 05-01-2005 09:18:47 | | Region 225E | AT&T Wireless (216) | SANYO RL-4920 | 0 | N |
| 240 | 6728 | 05-01-2005 09:20:39 | (44.93028, -93.40986) | Region 225E | AT&T Wireless (216) | SANYO RL-A760 | 3 | Y |
| ... | | | | | | | | |
| 243 | 3625 | 05-05-2005 10:16:37 | (44.90262, -93.39700) | Region 225H | MVNO (222) | Blackberry 7100g | 2 | Y |
| 246 | 1897 | 05-01-2005 09:20:39 | (44.93028, -93.40986) | Region 225E | MVNO (222) | Blackberry 7100g | 0 | N |
| ... | | | | | | | | |
| 249 | 2210 | 05-07-2005 08:19:58 | | Region 225I | AT&T Wireless (216) | Samsung X427M | 0 | N |
| 252 | 0509 | 05-08-2005 23:56:19 | | Region 225I | Sprint (219) | Sony Ericsson T237 | 0 | N |

| Communication ID 601 | Region 604 | Retries 607 | Dropout? 610 | Score 613 |
|---|---|---|---|---|
| 23056 | E | 1 | 1 | 4 |
| 23057 | K | 0 | 0 | 0 |
| 23058 | M | 3 | 0 | 3 |
| 23059 | N | 3 | 0 | 3 |
| 23060 | B | 1 | 0 | 1 |
| 23061 | J | 1 | 0 | 1 |
| 23062 | J | 0 | 1 | 3 |
| 23063 | N | 3 | 0 | 3 |
| 23064 | F | 1 | 0 | 1 |
| 23065 | P | 0 | 1 | 3 |
| 23066 | F | 0 | 1 | 3 |
| 23067 | D | 3 | 0 | 3 |
| 23068 | N | 3 | 0 | 3 |
| 23069 | E | 0 | 0 | 0 |
| 23070 | D | 1 | 1 | 4 |
| 23071 | Q | 1 | 0 | 1 |
| 23072 | B | 2 | 0 | 2 |
| 23073 | C | 2 | 0 | 2 |
| 23074 | F | 0 | 0 | 0 |
| 23075 | H | 1 | 1 | 4 |
| 23076 | G | 0 | 0 | 0 |
| 23077 | R | 3 | 0 | 3 |
| 23078 | B | 0 | 0 | 0 |
| 23079 | M | 2 | 1 | 5 |
| 23080 | K | 1 | 0 | 1 |
| 23081 | C | 0 | 1 | 3 |
| 23082 | R | 4 | 0 | 4 |
| 23083 | L | 1 | 0 | 1 |
| 23084 | N | 3 | 1 | 6 |
| 23085 | J | 1 | 0 | 1 |
| 23086 | P | 0 | 0 | 0 |
| 23087 | D | 1 | 1 | 4 |
| 23088 | J | 0 | 0 | 0 |
| 23089 | E | 0 | 0 | 0 |
| 23090 | F | 0 | 0 | 0 |
| 23091 | Q | 1 | 1 | 4 |
| 23092 | G | 1 | 0 | 1 |
| 23093 | R | 4 | 0 | 4 |
| 23094 | F | 1 | 0 | 1 |
| 23095 | B | 1 | 0 | 1 |

| Communication ID 601 | Region 604 | Retries 607 | Dropout? 610 | Score 613 |
|---|---|---|---|---|
| 23096 | F | 0 | 0 | 0 |
| 23097 | K | 0 | 0 | 0 |
| 23098 | D | 2 | 0 | 2 |
| 23099 | A | 2 | 1 | 5 |
| 23100 | K | 0 | 0 | 0 |
| 23101 | Q | 0 | 0 | 0 |
| 23102 | A | 1 | 0 | 1 |
| 23103 | A | 1 | 0 | 1 |
| 23104 | K | 1 | 0 | 1 |
| 23105 | P | 0 | 0 | 0 |
| 23106 | H | 0 | 1 | 3 |
| 23107 | J | 0 | 0 | 0 |
| 23108 | Q | 1 | 0 | 1 |
| 23109 | K | 1 | 0 | 1 |
| 23110 | H | 1 | 0 | 1 |
| 23111 | B | 1 | 0 | 1 |
| 23112 | A | 0 | 1 | 3 |
| 23113 | L | 0 | 0 | 0 |
| 23114 | F | 0 | 0 | 0 |
| 23115 | P | 1 | 0 | 1 |
| 23116 | R | 1 | 1 | 4 |
| 23117 | N | 4 | 1 | 7 |
| 23118 | E | 0 | 0 | 0 |
| 23119 | N | 0 | 0 | 0 |
| 23120 | G | 2 | 0 | 2 |
| 23121 | J | 1 | 0 | 1 |
| 23122 | B | 0 | 0 | 0 |
| 23123 | P | 1 | 0 | 1 |
| 23124 | B | 0 | 0 | 0 |
| 23125 | F | 0 | 0 | 0 |
| 23126 | K | 1 | 0 | 1 |
| 23127 | G | 0 | 0 | 0 |
| 23128 | A | 1 | 1 | 4 |
| 23129 | B | 1 | 0 | 1 |
| 23130 | E | 0 | 0 | 0 |
| 23131 | R | 2 | 0 | 2 |
| 23132 | M | 3 | 0 | 3 |
| 23133 | R | 0 | 0 | 0 |
| 23134 | N | 3 | 1 | 6 |
| 23135 | D | 1 | 0 | 1 |
| . . . | | | | |

FIGURE 6B

| Region A | | | | | Region B | | | | | Region C | | | | | Region D | | | | |
|---|---|---|---|---|---|---|---|---|---|---|---|---|---|---|---|---|---|---|---|
| 23099 | 2 | 1 | 5 | 1 | 23060 | 1 | 0 | 1 | | 23073 | 2 | 1 | 2 | | 23067 | 3 | 0 | 3 | |
| 23102 | 1 | 0 | 1 | | 23072 | 2 | 0 | 2 | | 23081 | 0 | 0 | 3 | | 23070 | 1 | 1 | 4 | |
| 23103 | 1 | 0 | 1 | | 23078 | 0 | 0 | 0 | | | | | | | 23087 | 1 | 1 | 4 | |
| 23112 | 0 | 1 | 3 | | 23095 | 1 | 0 | 1 | | | | | | | 23098 | 2 | 0 | 2 | |
| 23128 | 1 | 1 | 4 | | 23111 | 1 | 0 | 1 | | | | | | | 23135 | 1 | 0 | 1 | |
| 601 | 607 | 610 | 613 ↗701 | | 23122 | 0 | 0 | 0 | | | | | | | | | | | |
| | | | | | 23124 | 0 | 0 | 0 | | | | | | | | | | | |
| | | | | | 23129 | 1 | 0 | 1 | | | | | | | | | | | |
| Average Score = 2.8 | | | | | Average Score = 0.8 | | | | | Average Score = 2.5 | | | | | Average Score = 2.8 | | | | |
| Region E | | | | | Region F | | | | | Region G | | | | | Region H | | | | |
| 23056 | 1 | 4 | | | 23064 | 1 | 0 | 1 | | 23076 | 0 | 0 | 0 | | 23075 | 1 | 1 | 4 | |
| 23069 | 0 | 0 | | | 23066 | 0 | 1 | 3 | | 23092 | 1 | 0 | 1 | | 23106 | 0 | 1 | 3 | |
| 23089 | 0 | 0 | | | 23074 | 0 | 0 | 0 | | 23120 | 2 | 0 | 2 | | 23110 | 1 | 0 | 1 | |
| 23118 | 0 | 0 | | | 23090 | 1 | 0 | 1 | | 23127 | 0 | 0 | 0 | | | | | | |
| 23130 | 0 | 0 | | | 23094 | 0 | 0 | 0 | | | | | | | | | | | |
| | | | | | 23096 | 0 | 0 | 0 | | | | | | | | | | | |
| | | | | | 23114 | 0 | 0 | 0 | | | | | | | | | | | |
| | | | | | 23125 | 0 | 0 | 0 | | | | | | | | | | | |
| Average Score = 2.8 | | | | | Average Score = 0.6 | | | | | Average Score = 0.8 | | | | | Average Score = 2.7 | | | | |

Region I

| ID | | | |
|---|---|---|---|
| 23061 | 1 | 0 | 1 |
| 23062 | 0 | 1 | 3 |
| 23085 | 1 | 0 | 1 |
| 23088 | 0 | 0 | 0 |
| 23107 | 0 | 0 | 0 |
| 23121 | 1 | 0 | 1 |

Average Score = 1.0

Region K

| ID | | | |
|---|---|---|---|
| 23057 | 0 | 0 | 0 |
| 23080 | 1 | 0 | 1 |
| 23097 | 0 | 0 | 0 |
| 23100 | 0 | 1 | 0 |
| 23104 | 1 | 0 | 1 |
| 23109 | 1 | 0 | 1 |
| 23126 | 1 | 0 | 1 |

Average Score = 0.6

Region L

| ID | | | |
|---|---|---|---|
| 23083 | 1 | 0 | 1 |
| 23113 | 0 | 0 | 0 |

Average Score = 0.5

Region M

| ID | | | |
|---|---|---|---|
| 23058 | 3 | 0 | 3 |
| 23079 | 2 | 1 | 5 |
| 23132 | 3 | 0 | 3 |

Average Score = 3.7

Region N

| ID | | | |
|---|---|---|---|
| 23059 | 3 | 0 | 3 |
| 23063 | 3 | 0 | 3 |
| 23068 | 3 | 0 | 3 |
| 23084 | 3 | 1 | 6 |
| 23117 | 4 | 1 | 7 |
| 23119 | 0 | 0 | 0 |
| 23134 | 3 | 1 | 6 |

Average Score = 4.0

Region P

| ID | | | |
|---|---|---|---|
| 23065 | 0 | 3 | 3 |
| 23086 | 0 | 0 | 0 |
| 23105 | 0 | 0 | 0 |
| 23115 | 1 | 0 | 1 |
| 23123 | 1 | 0 | 1 |

Average Score = 1.0

Region Q

| ID | | | |
|---|---|---|---|
| 23071 | 1 | 0 | 1 |
| 23091 | 1 | 1 | 4 |
| 23101 | 0 | 0 | 0 |
| 23108 | 1 | 0 | 1 |

Average Score = 1.5

Region R

| ID | | | |
|---|---|---|---|
| 23077 | 3 | 0 | 3 |
| 23082 | 4 | 0 | 4 |
| 23093 | 4 | 0 | 4 |
| 23116 | 1 | 1 | 4 |
| 23131 | 2 | 0 | 2 |
| 23133 | 0 | 0 | 0 |

Average Score = 2.8

FIGURE 7B

ASSESSING WIRELESS NETWORK QUALITY

TECHNICAL FIELD

This disclosure relates to assessing quality, at a large number of locations, of one or more wireless networks; more particularly, the disclosure relates to aggregating and analyzing the quality assessments from a small number of locations, such as, for example, at facilities associated with an information provider.

BACKGROUND

As the number of features available in wireless communication devices has increased, user expectations have increased that wireless access will be available wherever they may be. People now expect to have access on the road, in coffee shops, at home and in the office, through wireless communication devices, to information previously available only from a personal computer that was physically connected to an appropriately provisioned network. They want stock quotes, weather reports and directions to the nearest seafood restaurant from their cell phones, email from their personal digital assistants (PDAs), up-to-date documents from their smartphones, and timely, accurate search results from all their devices. They may also want networked, real-time, interactive, multi-user gaming. They also want voice communications with a high level of service quality.

To keep up with wireless device users' insatiable appetite for more features in more locations, wireless service providers continually assess their wireless service performance and quality and regularly expand their wireless coverage to new areas or improve their coverage within their current network. To assess performance, a wireless service provider may regularly analyze quality from a number of test units. The test units could be fixed or mobile. For example, use of mobile test units to assess wireless service performance is reflected in one carrier's "Can you hear me now?" marketing campaign, showing a technician touring the countryside. A wireless service provider may also assess performance by simulating wireless signal quality or coverage based on, for example, geography, atmospheric conditions, volume of wireless service traffic, or other parameters.

These techniques for assessing performance may be cumbersome and expensive. They may only capture information for a small number of locations at particular times. Moreover, they may only capture information for a single wireless service provider or a small number of wireless service providers. The information that is captured may only be available to the entity that collected it, even though other entities, such as other wireless service providers or consumers, may benefit from the information.

Therefore, there is need for a method of assessing quality of wireless service of a plurality of wireless service provider networks in a more convenient and more flexible manner that also can provide additional helpful information to wireless users, carriers, and others.

SUMMARY

This document discloses methods and systems that aggregate and analyze information indicative of network coverage by one or more wireless service providers over a geographic area.

In certain embodiments, systems may measure coverage quality, not directly at the user device (such as by drive testing with active handsets), but from a location or locations external to the normal receiver and transmitter locations in a network. As one example, the performance can be measured by an information provider that is accessed by wireless devices that are part of a network or networks. The information provider may comprise, for example a typical search engine or other Internet data provider. Such a system may provide one or more advantages. For example, such a system may enable simple aggregation of quality of service information by a single entity. Such a system may also permit collection of such information outside a carrier's traditional network infrastructure, and outside the carrier organization itself. In addition, such information may also be collected easily across multiple carriers, without requiring coordination of the carriers, so that comparative information may be made available for analysis.

With such coverage analysis information available, various reports and services may also be provided. For example, the service provider or another company may use the information to let consumers comparison shop for carriers—much like a Froogle™ for wireless carriers. The reports, which may be generated in real-time in response to specific requests from users, may include, for example, maps showing coverage for a carrier or comparing carriers in a certain geography at a point in time, animations of coverage over time, coverage over a path at a certain time range (e.g., during a commute or commutes), graphs of coverage at a certain point over time, and indications of coverage at multiple locations at different times (e.g., over a commute path in during drive time, at the office during work hours, and at home over night). Other appropriate reports and displays may also be generated from the collected data.

In some embodiments, a method of providing information indicative of network coverage by one or more wireless service providers in a geographic area may include obtaining, at an information provider, performance indicators for a plurality of accesses to the information provider by a plurality of wireless devices. The performance indicators may be correlated with one or more network service areas. Related performance indicators may be aggregated to produce one or more aggregated performance indicators. A human-discernible representation of network performance for one or more network service areas may be produced.

A wireless device may be, for example, a wireless personal digital assistant. The information provider may not be affiliated with the one or more wireless service providers. The method may further include obtaining location information associated with the wireless devices. The location information may be obtained from a number of different technologies including a global positioning system (GPS), base-station triangulation technologies, cell identification, etc. In the case that a precise location is not available, location information can also be predicted based on previously received heading, speed and geographical (latitude and longitude) location of a wireless device. The location information can be made available to the information provider through many different means including an HTTP request, a proprietary message from a software client running on the wireless device, or even a request for the user's location that is originated from the information provider. In addition, location information can also be obtained if the device initiates a request for information that includes a specific location (i.e., a search for pizza restaurants in Mountain View, Calif.).

In some embodiments, a system for providing information indicative of network coverage by one or more wireless providers over a geographic area may include a service performance monitor, a performance correlation, and a report generator. The service performance monitor may obtain performance indicators for a plurality of accesses to an information provider by a plurality of wireless devices located over the entire geographical area of interest. The performance correlator may correlate the performance indicators with one or more network service areas and aggregate related performance indicators to produce one or more aggregated performance indicators. The report generator may produce, from the aggregated performance indicators, a representation of network performance for the one or more network service areas.

The systems and techniques described herein may provide one or more of the following advantages. Information about quality of network coverage provided by one or more wireless service providers may be collected from a single location or from a small number of locations. The collected information may include information about a large number of locations, at a variety of different times and for various wireless service providers and various wireless devices.

The details of one or more embodiments are set forth in the accompanying drawings and in the description below. Other features, objects and advantages will be apparent from the description and drawings, and from the claims.

DESCRIPTION OF DRAWINGS

These and other aspects will now be described in detail with reference to the following drawings.

FIG. 5 is a table showing entries in an exemplary database which an information provider may use to store information related to one or more wireless service providers.

FIGS. 6A and 6B show another table of entries in an exemplary database.

FIGS. 7A and 7B illustrate several geographic regions associated with the entries that are shown in FIGS. 6A and 6B.

Like reference symbols in the various drawings indicate like elements.

DETAILED DESCRIPTION OF EXEMPLARY EMBODIMENTS

The systems and methods described herein relate to assessing quality of one or more wireless networks. The methods may be implemented, for example, by an information provider such as a search engine service or other information provider that distributes information in response to requests received from a plurality of wireless devices.

Figure 1A:
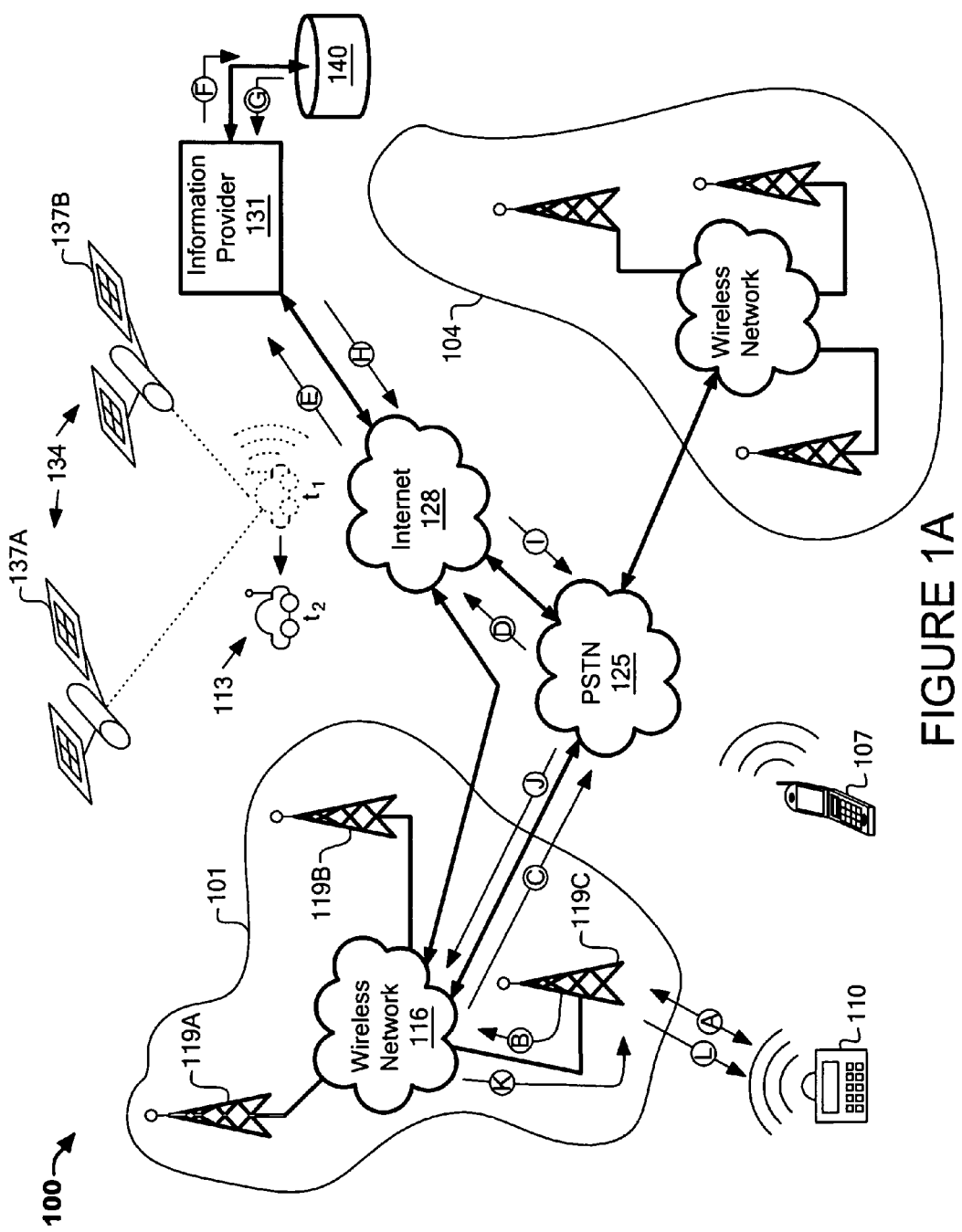
FIG. 1A is a diagram showing an exemplary environment in which wireless devices and wireless service providers may operate.

FIG. 1A is a diagram showing an exemplary environment 100 in which wireless devices and wireless service providers may operate. Within this environment 100, the systems and methods described herein may be used to assess quality of coverage of one or more wireless service providers' networks. The environment 100 may include a plurality of wireless service provider networks such as the wireless service provider networks 101 and 104. The wireless service provider networks may provide, for example, voice and data services. A variety of wireless devices may access the services provided by the wireless service provider networks such as a wireless cellular telephone 107, a wireless-enabled personal digital assistant (wireless PDA) 110, and a vehicle communication system 113. In addition, the networks may service separate or overlapping geographies, and may be networks for a single or multiple carriers.

A wireless service provider network 101 may include a wireless network 116 comprising various network equipment and a series of wireless towers 119A, 119B and 119C, through which data and voice communications and services may be transmitted or received. As shown, the wireless network connects to the public switched telephone network (PSTN) 125 and to the Internet 128. The PSTN 125 may also connect to the Internet 128. Other networks may be accessible from either the PSTN 125 or from the Internet 128. For example, an information provider 131 may be accessible from the Internet 128 to users of the wireless service provider network 101, such as, for example, the wireless PDA 110. In any given environment, more than one wireless service provider network may exist. For example, as shown, both the wireless service provider 101 and the wireless service provider 104 coexist in the exemplary environment.

The exemplary environment 100 may further include a system for identifying the location of a device. For example, the system may include a global positioning system (GPS) 134. The global positioning system may include a plurality of satellites, such as satellites 137A and 137B, which may continuously transmit signals that devices can use to determine precise locations. For example, the vehicle wireless device 113 may receive a plurality of GPS signals, and from them, it may determine a precise location of the vehicle. Based on the plurality of location determinations, the vehicle communication system may also be able to predict a future location of the vehicle. For example, based on a location determination at time $t_1$, the vehicle communication system may be able to determine a vehicle heading and speed from which it can predict the location of the vehicle at a time $t_2$. Other wireless devices may also receive GPS signals from which they can determine precise location. For example, the wireless PDA 110 may receive GPS signals from which it can determine its precise location. A GPS-enabled wireless phone, such as the wireless phone 107, may also receive GPS signals from which it can determine a precise location at any given time. Any of these devices may also have a determined heading and speed. Each device may transmit determined location coordinates with other transmissions. For example, along with a request for data sent to an information provider, such as the information provider 131, the wireless PDA 110 may transmit GPS location coordinates. GPS provides just one method for obtaining location information. Location information may be obtained through other means, such as, for example, base-station triangulation technologies; base station location information; cell identification; explicit requests of the user to provide location information; inferences drawn from user data, such as location-specific requests; and location identification software running on a wireless device.

The arrows labeled with letters in FIG. 1A show an exemplary communication path from the wireless PDA 110 to the information provider 131. As shown, the wireless PDA 110 transmits a request for data over path A. The wireless antenna 119C receives the request for data and conveys it to the wireless network 116 over path B. In some implementations, the wireless network 116 forwards the data request to the PSTN 125 as shown over path C, and the PSTN 125 forwards the data request to the Internet 128 over path D. In other implementations (not shown), the wireless network 116 forwards the data request directly to the Internet 128, without routing it through equipment within the PSTN 125. Over the Internet 128, the data request is routed, via path E, to the information provider 131. A server at the information provider accesses the requested data in an information store 140 over path F. The information store 140 provides the requested data to the information provider's server over path G. The information provider server sends the requested data over the Internet 128 via path H. Over the Internet 128, the requested data is transmitted, in some implementations, to the PSTN 125 via path I. The PSTN 125 sends the data to the wireless network 116 over path J. In some implementations (not shown), the requested data is transmitted directly from the Internet 128 to the wireless network 116. The wireless network 116 forwards the data to the corresponding wireless tower 119C, which forwards the requested data to the wireless PDA 110 over paths K and L.

This exemplary communication path may represent, for example, a search request to an information provider such as the well-known Google™ search engine. The user of the wireless PDA may request, for example, information from the Google Local™ service or another appropriate service. The transmission from the user's wireless PDA may include the search request in addition to information about the user's geographic location. The information provider 131 may receive the search request in a conventional manner and provide its response in a known manner, such as using results from the Google PageRank™ system and process. The information provider 131 may also use the location information and other information that it is able to determine about the communication process, as described in more detail below, to determine information about the quality of the wireless network on which the user's request and the resulting response were transmitted.

Figure 1B:
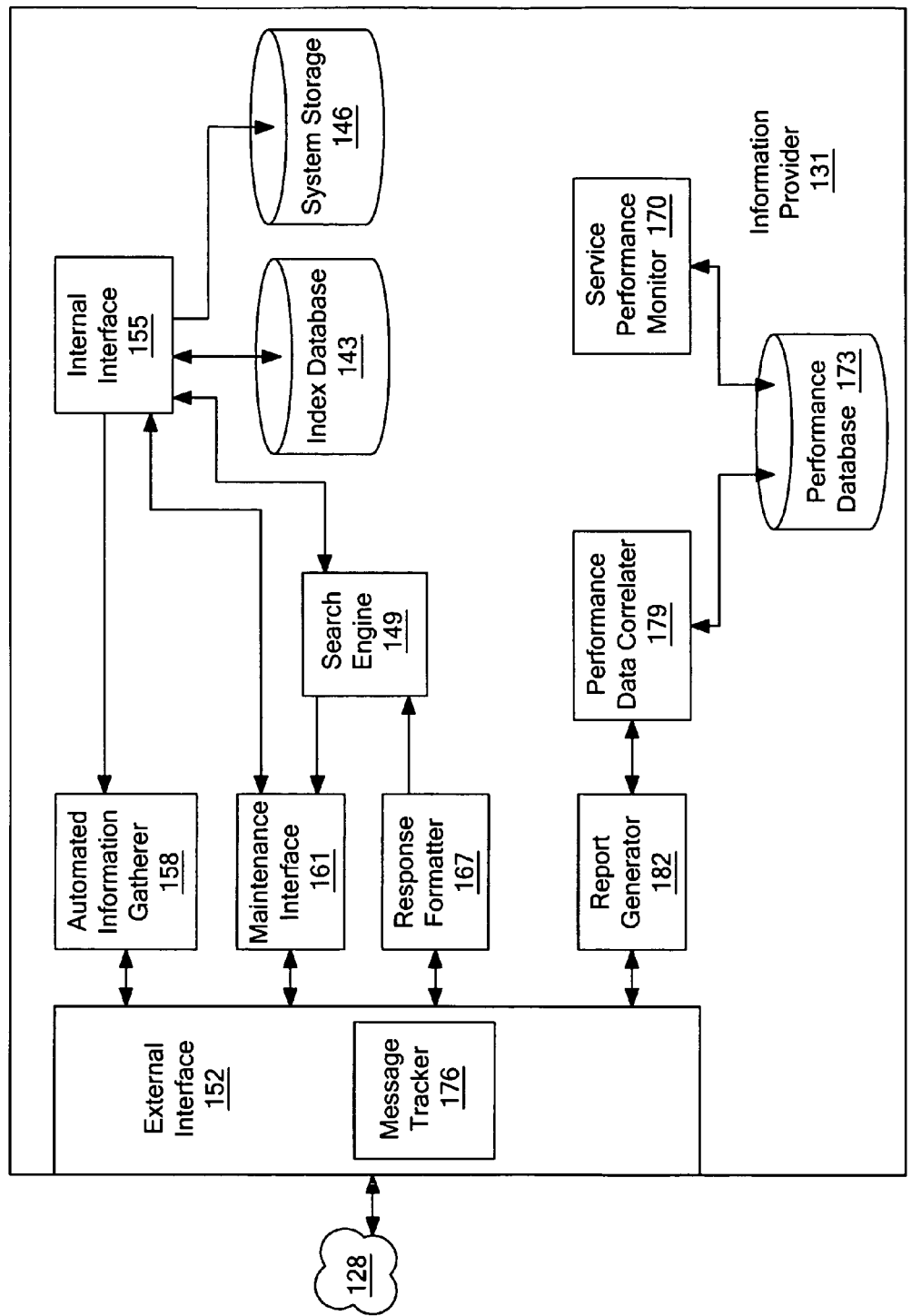
FIG. 1B is a schematic diagram showing additional details of the information provider that is shown in FIG. 1A.

FIG. 1B is a schematic diagram showing additional details of the information provider 131. The information provider 131 may receive requests for data from users and generate responses to the requests. In some embodiments, the information provider 131 may be an Internet search engine. In some embodiments, the information provider 131 may provide information such as real-time traffic information, weather forecasts, news or real-time stock quotes. The information may include text, graphics, animations, audio, video or other appropriate information.

The information provider 131 is connected to the Internet 128 to communicate with users who may be interested in accessing the services provided by the information provider. The information provider 131 could also be connected to other networks (not shown), such as, for example, an internal company network, or a local wireless communication network. The information provider 131 may be divided into separate systems to allow for scalability, data integrity, or data security, and it may be connected to the Internet 128 or to another network in any of a variety of ways, as is commonly known.

The information provider 131 includes an index database 143 and system storage 146. The index database 143 contains data that represents information that the information provider 131 provides to users. For example, the information provider 131 may comprise a typical Internet search engine, and the index database 143 may contain links to information stored on the Internet (outside of the information provider 131). When a user selects a link, the information to which the link points may be provided. As another example, some information to which entries in the index database 143 point may be stored in the system storage 146. For example, the system storage 146 may "mirror" information for which search reports are regularly received—such as, for example, breaking news stories or weather or traffic information. The system storage 146 may also store various components needed for general operation of the information provider 131, such as applications, system parameters and information about users who access the system.

In some embodiments, the index database 143 and the system storage 146 may be included in the data store 140 that is shown in FIG. 1A. The index database 143 may or may not be cached. For example, the index database 143 may include a separate cached index database (not shown) to support faster access to search results. The system storage 146 may be local to the information provider 131, or it may be distributed, such as, for example, in an external server or storage farm (not shown). Within the information provider 131, a search engine 149 operates to produce search results that include information stored in the index database 143 or the system storage 146, in response to search requests from users.

The information provider 131 communicates through an external interface 152 and an internal interface 155. Through the external interface 152, the information provider 131 receives requests and transmits responses. Through the internal interface 155, the information provider 131 internally routes information to and from the index database 143 and system storage 146. These interfaces are shown as distinct interfaces, but they may be partially or fully combined, or they may include additional interfaces. As an example, the internal interface 155 may comprise interface devices for a high-speed, high-bandwidth network such as SONET, Infiniband or Ethernet, or any suitable communication hardware operating under an appropriate protocol such that the information provider 131 can respond to a large number of distinct requests simultaneously. The external interface may 152 comprise network interface cards (NICs) or other communication devices and may similarly include components or interfaces of a high-speed, high-bandwidth network. The precise design of the information provider 131 is not critical to this disclosure and could take any suitable form.

The information in the index database 143 may be gathered by an automated information gatherer 158, such as, for example, a crawler. The information gatherer 158 may continuously or almost continuously obtain new information from sources connected to the Internet 128 or to other network(s) connected to the information provider 131. The index database 143 may index information that is stored in the system storage 146, or it may index data that is accessible from the Internet 128 or from another network. In addition to being added to the index database 143 or system storage 146 in an automated fashion, information may also be manually loaded in or retrieved from the index database 143 or the system storage 146 through a maintenance interface 161. The maintenance interface 161 may allow an information provider 131 administrator to manually add bulk data to the index database 143 or to the system storage 146.

Data requests, such as data requests from users, may be received through the external interface 152 and handled by a request processor (not shown in the figures). For example, the request processor 164 may parse the requests and reformat from, for example, HTML (hypertext markup language) or text format, to search terms or strings that are compatible with the search engine 149. The information generated by the search engine 149 in response to a request may be converted to another format by a response formatter 167 in a manner that allows it to be used by the requesting device. For example, the response formatter 167 may convert data that is in an internal format to HTML, WAP, XML, VoiceXML, etc. After formatting the response, the information provider 131 may transmit it to the requesting user via its external interface 152.

Information may be extracted and captured from incoming data requests by a service performance monitor 170. The monitor 170 may, for example, read a copy of the stream of data coming in through external interface 152, or a sub-set of that data, such as only data identified as related to mobile devices. This extracted information may be stored in a performance database 173. For example, data requests may include a header that includes information about a user making the data request. More particularly, in the case of a search request received from the Internet, the header information may include a date and time stamp and an Internet Protocol (IP) address that identifies the device from which the request originated. As another example, in the case of an information request originating from a wireless device, the header may include a date and time stamp, and information about the wireless service provider, the wireless device model, a user associated with the wireless device, location coordinates of the device, or other information. In addition, the system may have previously stored information about a device (such as information entered by a user as part of a registration process), and may refer to that information by using an identifier received from a device (e.g., like a "cookie").

The external interface 152 may include a message tracker 176 that extracts additional information from incoming data requests or outgoing data responses. For example, in some embodiments, the information provider 131 and the device from which a data request originates may communicate with a guaranteed delivery protocol, such as, for example, TCP/IP. In such a system, the message tracker 176 may track outgoing response messages and corresponding incoming handshake messages to determine whether a response message is actually delivered. The message tracker 176 may be configured to resend a response message whose receipt has not been confirmed within a specific period of time. The message tracker 176 may be further configured to resend a response message a specific number of times, after which it no longer tracks the message.

The message tracker 176 may store information about any messages it resends. For example, the message tracker 176 may store a number in a "Retries" field in the performance database 173 corresponding to the number of times it resends a message. The message tracker 176 may further store information about whether it stops tracking a message in, for example, a "Dropped" field in the performance database 173. Similar functionality may be provided in a mobile device and the device may be programmed to send similar information to information provider 131.

As another example, the information provider 131 and the device from which the data request originates may, in some embodiments, communicate with an unguaranteed protocol, such as UDP. Even in embodiments that utilize a guaranteed protocol, the information provider 131 and the device from which the requests originates may communicate through an intermediate device (not shown) that prevents the information provider 131 from determining whether a response message has been ultimately delivered to the requesting device. For example, a wireless service provider may act as an intermediary between a wireless device and the information provider 131. More particularly, a wireless service provider may receive from the wireless device a data request, such as, for example, a search request for a specific restaurant near a specific location. The wireless service provider may forward the search request to the information provider 131 and may subsequently receive the corresponding information response. The wireless service provider may then forward the information response to the wireless device after confirming its receipt of the information response to the information provider 131. The wireless service provider may subsequently fail to deliver the information response to the requesting device.

In either of the above examples—where the information provider 131 uses an unguaranteed protocol, or where the information provider 131 and requesting device are separated by an intermediary device that prevents the information provider 131 from confirming ultimate deliver of the information response—the message tracker 176 may still be able to identify retried data requests. For example, the message tracker 176 may identify a first and second identical data request, originating from the same wireless device, within a short period of time. The message tracker 176 may determine that the second data request was a resend by the requesting device after it did not receive a response to the first data request. The message tracker 176 may then record, in the performance database 173, the second data request as a retry or a drop associated with the first data request.

In some embodiments, an intermediary device between the information provider 131 and the device may be configured to transmit information about dropped or retried information responses, and the message tracker 176 may store this information in the performance database 173. Also, the mobile device may track response time from its end, submit that time to information provider 131, and the submitted time may be compared to the response time in other parts of the path to determine or estimate the response time of the wireless network.

Information in the performance database 173 may be manipulated and analyzed by a performance data correlator 179. The performance data correlator 179 may identify data sets in the performance database 173 that include related performance data and may subsequently compile and analyze the identified data sets. For example, the performance data correlator 179 may identify data sets related to data requests from, for example, a specific time of day, a specific wireless service provider, a particular wireless device model, a specific location, or a combination or combinations of such factors. From fields that store information about retries or dropped information responses or about other relevant performance indicators, the performance data correlator 179 may generate inferences about signal quality associated with the requests from the specific time of day, the specific wireless provider, or the specific location. For example, if the performance data correlator 179 identifies a set of data from a specific time of day and location that is associated with a large number or retries or drops, the performance data correlator 179 may generate an inference that signal quality for that specific time of day and location is poor.

Analyzed data may be formatted for presentation to a user by a report generator 182. The report generator 182 may format the analyzed data in a way that effectively communicates performance data to a user. For example, the report generator 182 may generate a report that presents performance data as a function of wireless service provider, location, time, or other parameter, or that compares performance data for two or more wireless service providers, locations, times, devices, etc.

Figure 2A:
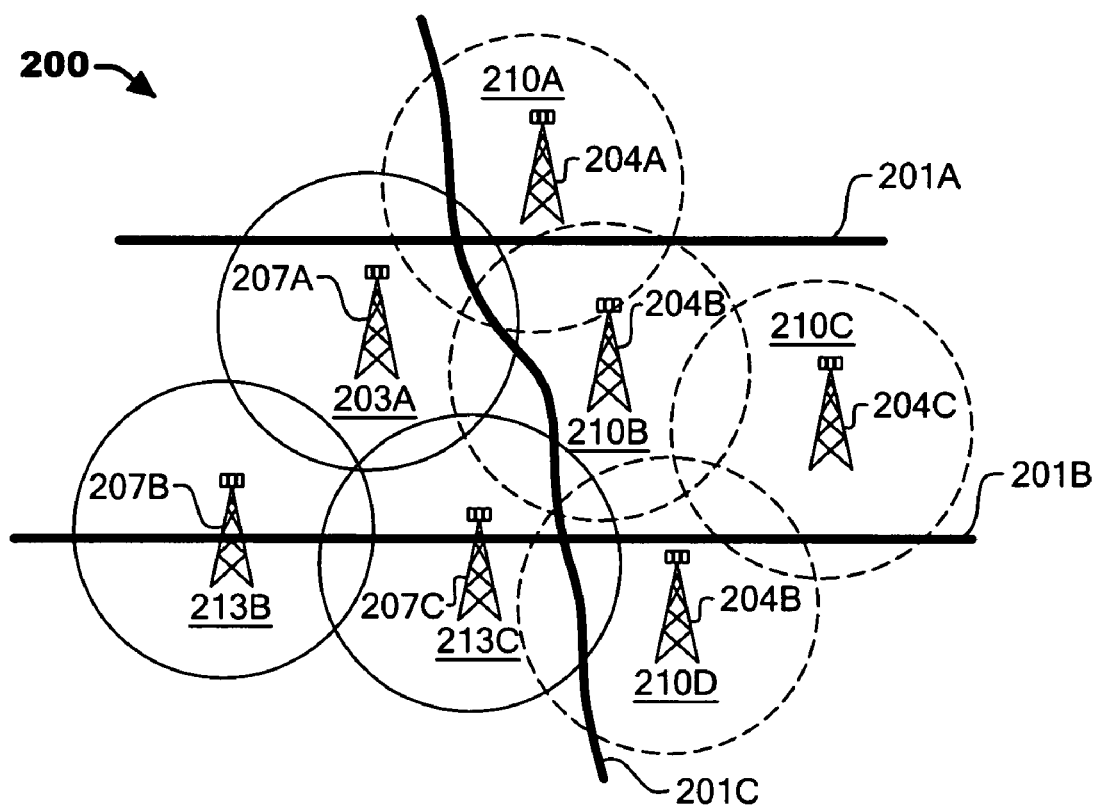
FIG. 2A is a diagram illustrating an exemplary geographic area for which wireless service quality may be assessed.
Figure 2B:
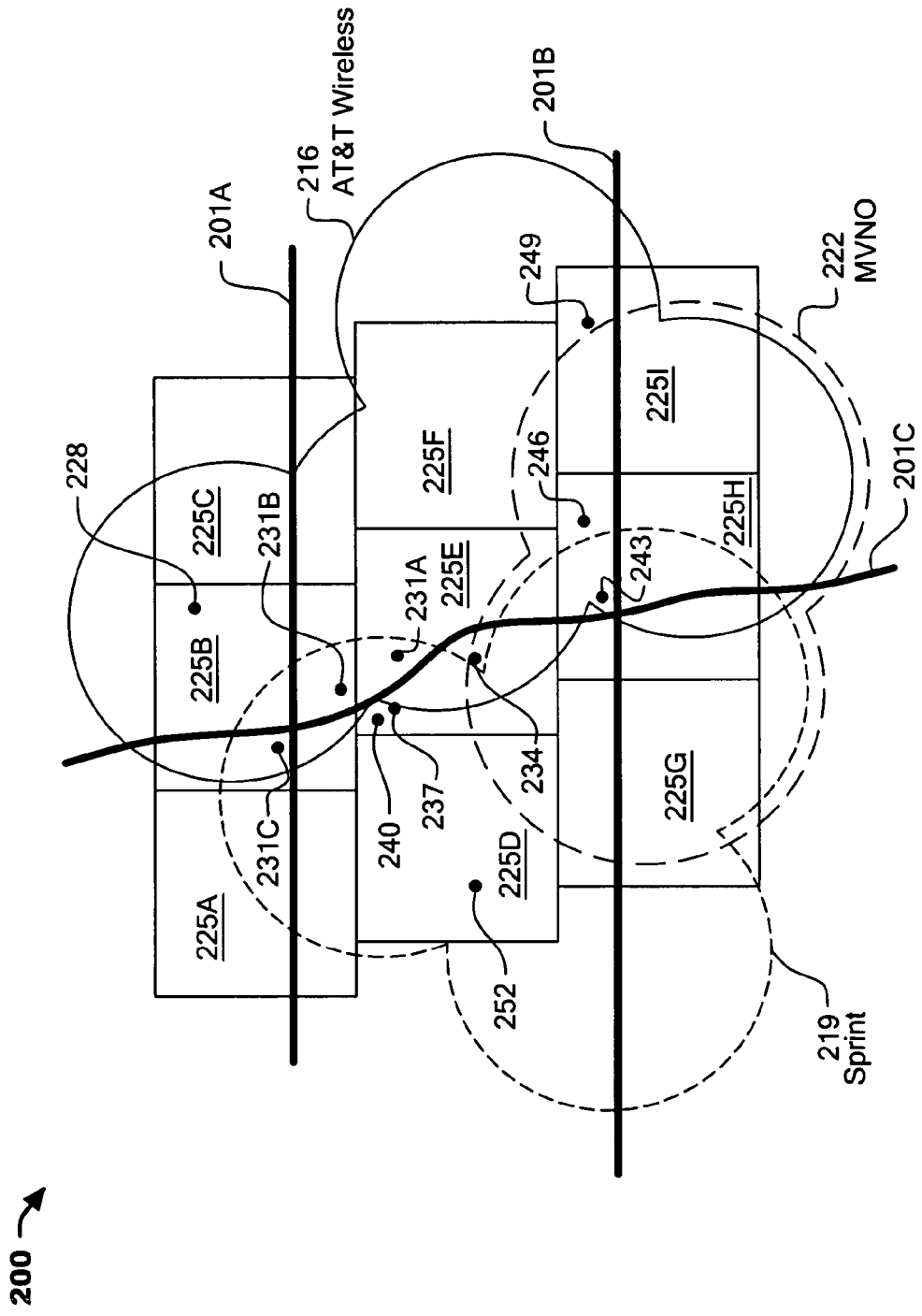
FIG. 2B is another diagram illustrating the exemplary geographic area that is shown in FIG. 2A.

FIG. 2A and FIG. 2B are diagrams illustrating an exemplary geographic area 200 for which wireless service quality may be assessed. As shown, the geographic area 200 includes highways 201A, 201B and 201C. Also within the geographic area 200 are a plurality of wireless towers 204A-D and 207A-C and corresponding wireless cells 210A-D and 213A-C. Each cell 210A-D and 213A-C may define an area of coverage for each wireless tower 204A-D and 207A-C. As shown in FIG. 2B, one set of wireless towers 204A-D and the corresponding cells 210A-D may correspond to a first network 216 or carrier, and another set of wireless towers 207A-C and the corresponding cells 213A-C may correspond to second network 219 or carrier. The cells 210A-D within the network 216 overlap to facilitate "handoff" of wireless devices from one wireless tower to another. In addition, the cells 210A, 210B and 210C of the first network 216 overlap with the cells 213A and 213C of the second network 219 such that wireless communication services may be available in some areas from both the first network 216 and the second network 219. Networks other than cellular networks, e.g., wireless Internet access points, may also provide information to the system.

The wireless networks illustrated in FIG. 2A and FIG. 2B are merely exemplary. In many areas, wireless services may be available from many different networks. Moreover, the different networks may share some wireless towers or cells. For example, a Mobile Virtual Network Operator (MNVO) may not own all (or any) of the wireless towers through which it provides wireless communications services. Rather, an MNVO may lease time on physical equipment owned by other networks. For example, a third network 222 may lease the use of the wireless towers 204D and 207C and other network equipment necessary to provide wireless communication services in cells 210D and 213C. Moreover, two or more networks may own wireless towers that provide wireless communication services in the same area.

FIG. 2B illustrates a plurality of regions 225A-I within the geographic area 200. The regions 225A-I may be used as reference areas from which quality of wireless communication services may be assessed. For example, wireless communication services may be available in region 225E from all of the wireless networks 216, 219, and 222. The regions may be a fixed size and shape, as shown, or the regions may have varied size and shape and may include very small areas, such as a single coffee shop's hotspot, or a short section of a sidewalk. The shape of each region may correspond to a geographic features that impact wireless coverage. More particularly, geographic features such hills and valleys may naturally bound the extent of coverage associated with any specific wireless tower. The size of each region may also be related to population density, or by average "density" of wireless communications. For example, in a dense business district, such as an office park or a central business district of a large city, the regions may be smaller than regions associated with a region in a suburb.

The location of buildings may also impact the shape of various regions. For example, tall office buildings may block or reflect wireless signals from particular wireless towers. As a result, regions near the tall office buildings may be shaped to accommodate natural areas of continuous wireless reception from nearby wireless towers. Approximate boundaries of the regions may be identified by a range of GPS coordinates, or by some other means. For example, approximate boundaries may be identified by distances from one or more wireless towers. To assess quality of wireless service in a specific region, certain information may be stored for a plurality of wireless communications originating from that region. The information may be stored in a database and analyzed periodically.

Figure 3:
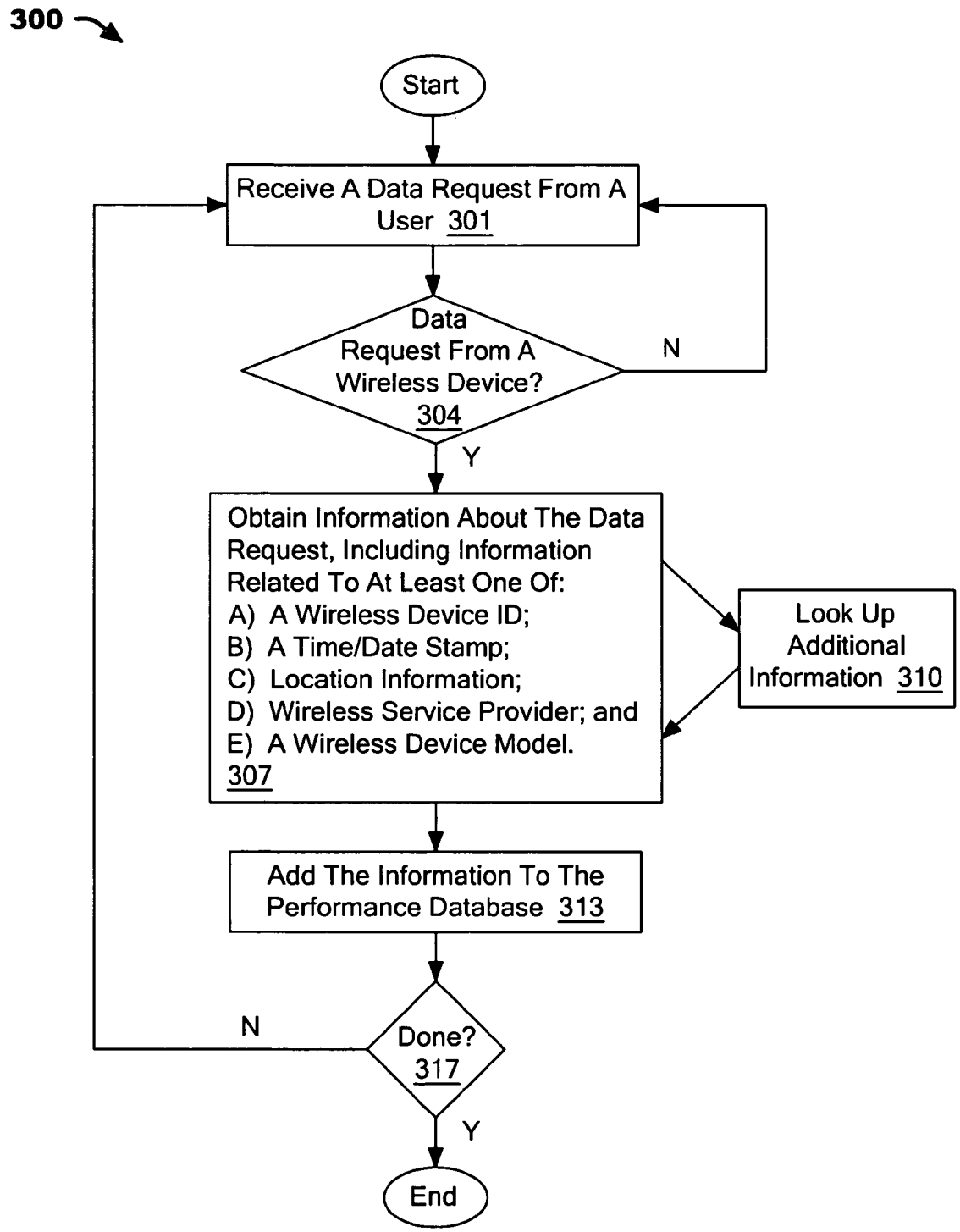
FIG. 3 is a flowchart showing an exemplary method for obtaining performance indicators for a plurality of accesses to an information provider.

FIG. 3 is a flow chart showing an exemplary method 300 for obtaining performance indicators for a plurality of accesses to an information provider. The actions may generally be performed by an information provider that receives user requests for data—for example, search requests—and responds to those requests with requested information.

The method 300 includes receiving (301) a data request from a user. For example, the request processor, via the external interface 152, may receive a data request from a user connected to the information provider 131 via the Internet 128.

The method 300 determines (304) whether the data request is from a wireless device. For example, the service performance monitor 170 may scan a header that is included in the data request for information that indicates that the request originated at a wireless device. If the data request did not originate from a wireless device, the service performance monitor 170 may ignore the data request and wait to receive another data request in action 301. If the data request did originate from a wireless device, the service performance monitor 170 may continue processing the data request by performing the actions below.

In an action 307, the method 300 extracts information about the data request. For example, the service performance monitor 170 may extract information from the header included in the data request. Specifically, the service performance monitor may extract information related to at least one of: a) a wireless device ID; b) a time and date stamp; c) location information; d) the wireless service provider associated with the data request; and e) a wireless device model.

In an action 310, the method 300 may obtain certain information associated with the data request by looking it up in another data source. For example, the header may include a numeric wireless device ID, such as an alphanumeric manufacturer model code. The information provider 131 may look up the model code to identify a device name for storage in the performance database 173. In some embodiments, the service performance monitor 170 may simply store the alphanumeric model code. As another example, a header for one data request may include GPS coordinate data associated with the device sending the data request. A header for another data request may include a location code associated with the wireless service provider or with particular cells or wireless towers within the wireless service provider's network. The information provider 131 may, for example, look up both the GPS coordinate data and the location code to obtain a region with which to associate the data request.

In an action 313, the method 300 adds the information to the database. For example, the service performance monitor 170 may store the information obtained in actions 307 and/or 310 in the performance database 173. More particularly, the service performance monitor 170 may store different kinds of information in different fields of a table in the performance database 173, is further explained with reference to FIGS. 5, 6A and 6B.

In an action 317, the method 300 determines whether to receive additional data. For example, in some embodiments, the service performance monitor 170 may only collect and store certain amounts of data, or data at certain times. In some embodiments, the service performance monitor 170 may continue to receive data in action 301 as the information provider 131 receives data requests.

Figure 4:
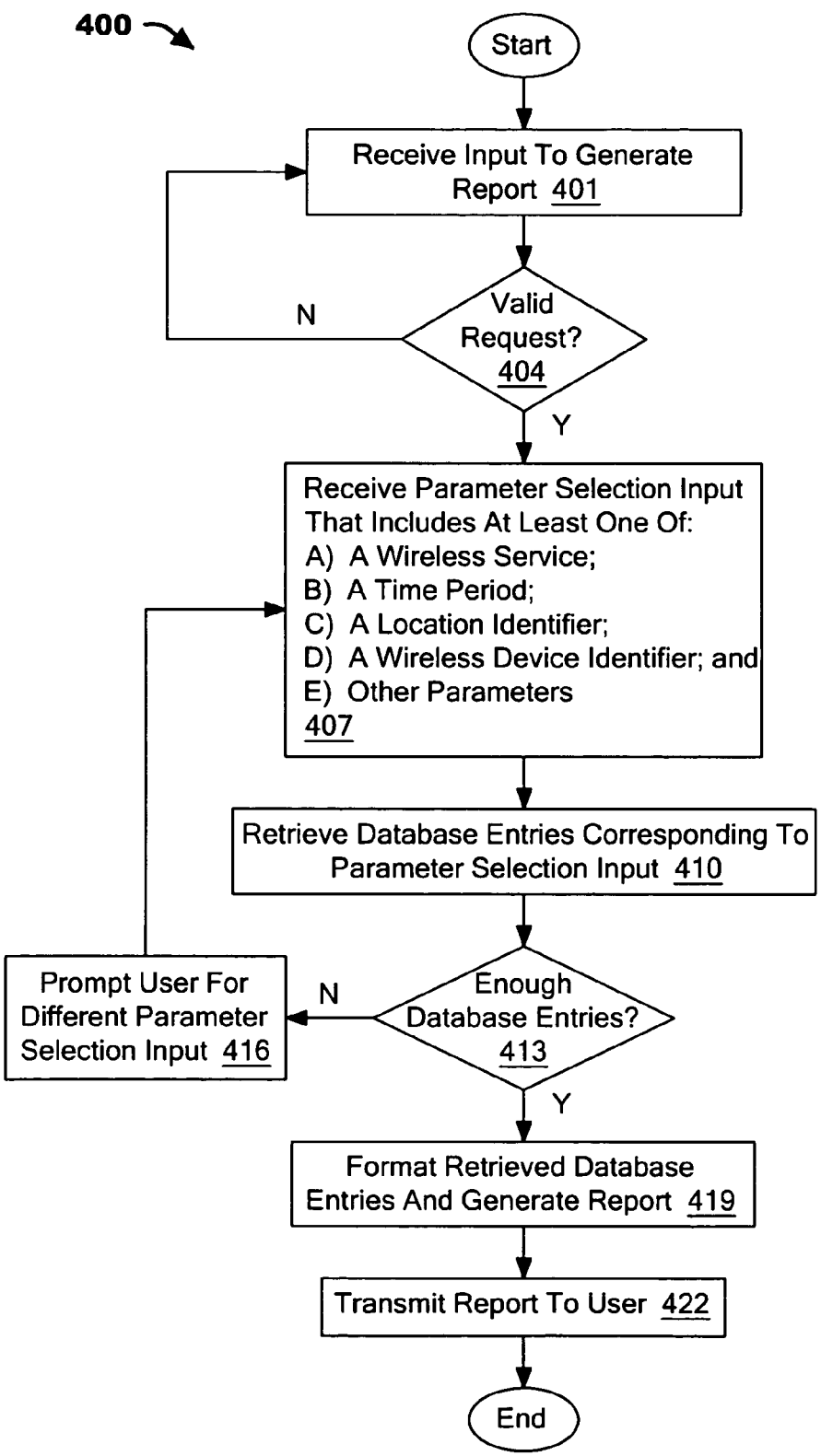
FIG. 4 is a flowchart showing an exemplary method for correlating and aggregating performance indicators and generating a report.

FIG. 4 is a flow chart showing an exemplary method 400 for correlating and aggregating performance indicators and generating a report that includes a text or pictorial representation of network performance for one or more network service areas. The actions shown in the flow chart may occur, for example, after those in the flow chart of FIG. 3.

In an action 401, the method 400 receives input to generate a report. For example, the report generator 182 may receive input from a user connected to the information provider 131 to generate a report that summarizes performance of a specific wireless service provider. The user requesting the report may be connected to the information provider 131 by a private network (not shown in FIG. 1A), or by the Internet 128. For example, the user may be seeking access from a web browser on a home computer.

In an action 404, the method 400 may authenticate the user requesting the report. For example, the report generator 182 may be configured to generate reports only for certain users. Specifically, in some embodiments, reports may not be available to the general public, but rather may only be accessible to certain users associated with the information provider 131.

In an action 407, the method 400 may receive parameter selection input that determines the type of report. For example, the report generator 182 may receive input that specifies parameters that include at least one of: a) a wireless service provider; b) a time period; c) a location identifier; d) a wireless device identifier; and e) other parameters.

In an action 410, the method 400 may retrieve database entries that correspond to the parameter selection input. For example, the performance data correlator 179 may retrieve entries from the performance database 173 that correspond to the wireless service provider, or time period, or location identifier, or wireless device identifier, or other parameters, or any combination of the foregoing that were received in the action 407.

In an action 413, the method 400 may determine whether there are enough retrieved database entries to process. For example, in some embodiments, the report generator 182 may be configured to only generate a report if the number of retrieved database entries from which the report is to be generated exceeds a threshold number. Such a limitation may ensure, for example, that the report draws from enough database entries to permit statistically significant inferences about service performance to be drawn.

If the method 400 determines that there are not enough database entries in the action 413, it may prompt the user for different parameters in an action 416. For example, the report generator 182 may indicate to the user that specific parameter selection input was not acceptable, and it may further suggest that the user enter other parameter selection input in the action 407. In some embodiments, the report generator 182 may suggest specific parameter selection input that is similar to the originally entered parameter selection input and for which there are sufficient database entries from which to generate a report.

In an action 419, the method 400 formats the database entries that were retrieved in the action 410. For example, the report generator 182 may sort database entries that the performance data correlator 179 retrieved from the performance database, and it may further generate a report that includes a graphical or a pictorial representation of the retrieved data.

In an action 422, the method 400 transmits the report to the user. For example, in some embodiments, the report generator 182 may send the report to the user who requested it via the external interface 152 and the Internet 128.

FIG. 5 is a table showing entries in an exemplary database 500 with which an information provider, such as the information provider 131, may store and analyze the information. The information provider 131 may store information about a large aggregation of data accesses in order to infer quality of wireless service of one or more wireless networks relative to such variables as, for example, time, location and model of wireless device.

In the database 500, each row corresponds to a distinct wireless communication sent over a wireless network (a "data point"). Each column in the table corresponds to different information related to the data communication. As shown in the exemplary database 500, the stored information includes a unique Communication ID 501, a Device ID 504, a Date/Time Stamp 507, location information in the form of either or both of a GPS coordinate 510 or a Cell Location 513, the Wireless Service Provider 516, the Wireless Device Model 519, any Retries 522 necessary to send or resend any data, and whether the data access request was fulfilled, or whether the access was terminated ("Dropped" 525) prior to fulfillment.

In some embodiments, actual performance of a wireless network or of a wireless device may be inferred from any Retries 522 that are necessary to fulfill a data request or a Dropout 525 that occurs in the process of fulfilling a data request. For example, if one or more retries are necessary to fulfill a request for data, a low signal quality may be inferred. Retries may be necessary for other reasons, but when a large number of wireless communications are considered, low signal quality at a particular location may primarily be manifested by either retries or by dropped wireless communications by a relatively large number of devices in the relevant geographic area. Other data indicating network quality may also be stored, such as elapsed time to fulfill a request over a network.

Data in the other columns of the database 500 may be used with data on Retries 522 and Dropouts 525 to correlate quality with time, location, provider, device, or any combination thereof. The Communication ID 501 may store a unique number associated with a specific wireless communication. As shown, each value in the Communication ID field 301 is a reference numeral that corresponds to a location point 228, 231A, 231B, 231C, 234, 237, 240, 243, 246, 249 or 252 that is shown in FIG. 2B. In other embodiments, the Communication ID 501 could be any other number, string or other identifier used by the database 500 to distinguish one specific wireless communication from another.

A Device ID 504 may store an identifier that associates a discrete wireless communication with a particular wireless device. The Device ID 504 may facilitate analysis of wireless communications over time by the same wireless device. For example, as shown, the rows corresponding to Communication IDs 231A, 231B and 231C capture wireless communications by the same device over a relatively short period of time. These wireless communications could be, for example, periodic requests for real-time traffic information from a vehicle wireless device, such as the vehicle communication device 113 as it travels along the highway 201C. Sequences of wireless communications such as 231A, 231B and 231C may be analyzed to track wireless signal quality at a particular time and by a particular device as a function of location. For example, since the wireless device is common, and the time is relatively fixed, variation in inferred signal quality for the data points 231A, 231B and 231C at the corresponding location may highlight variation as a function of location in the wireless signal quality of the network 219. More specifically, although none of the wireless communications 231A, 231B or 231C were dropped, wireless communication 231A required three retries. Given that other variables are relatively fixed, the retries could support an inference that signal quality is low at the location corresponding to data point 231A. In aggregate, many such sequences could be used to identify "dead zones," or zones of poor wireless service coverage, as will be further described with reference to FIGS. 6-8. Individual data points may also be used to empirically establish reception boundaries for particular wireless networks or particular cell boundaries within networks. For example, the data point corresponding to Access ID 231A originated from the Sprint network 219. The corresponding data request took three retries to fulfill. Many more data points such as this one could be used, for example, to empirically determine boundaries to particular cells.

The Date/Time Stamp 507 may be used to identify sequences such as the sequence comprising communication 231A, 231B and 231C described above. For example, a series of data points having a Date/Time Stamp 507 that are very close in time and that originate from the same device (as indicated by the Device ID 504) could be identified as a sequence. Quality information that varies as a function of location could be extracted from such sequences.

Figure 9:
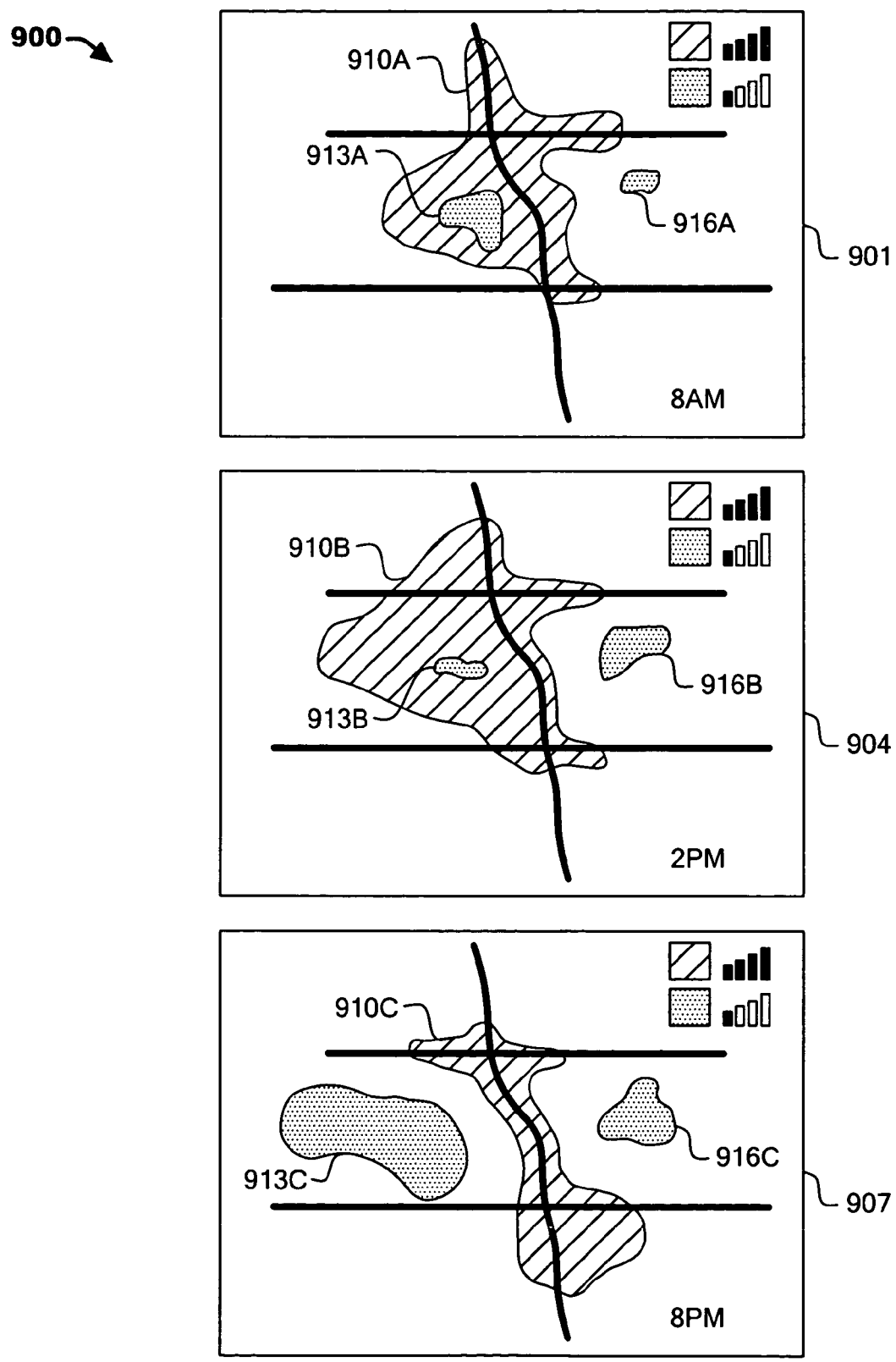
FIG. 9 is an exemplary report that includes a series of maps that may characterize wireless signal quality associated with a wireless service provider.

The Date/Time Stamp 507 field could also be used to group data points from many different days, but at the same general time of day. Such groupings may be useful for determining average wireless service assessments at a particular location, as a function of time, or as a function of wireless service provider. For example, wireless service quality at a particular location may generally be high at one point in the day, but generally low at another point in the day. Wireless service quality may be low, for example, if the wireless network is congested and unable to accept all network requests. As another example, a wireless service provider may maintain a number of adaptive or directional antennae along several major highways leading into the central business district of a large city. During a typical morning or afternoon commute, the antennae might be focused more on the highways and less on the central business district, in order to support commuters who may be using wireless devices while commuting. Between peak commute times, the antennae may be more focused on the central business district to support use of more wireless devices there. This change in focus of the antennae may result in variations in wireless signal quality as a function of time and location. Variation in signal quality may be intended by the wireless service providers in order to maximize capacity of wireless network equipment and to match capacity to needs of wireless device users. But the variation may not be advertised to consumers or to other wireless service providers. Variation in quality may also be a factor of the demand or load placed on certain portions of a network. Analysis of certain sets of data points may identify the regular variations in quality of wireless service over time or location. From the analysis, reports may be generated such as a report 900 that is shown in FIG. 9. Further, performance of more than one wireless network may be compared, for example, in a report 1000 (see FIG. 10) or a report 1100 (see FIG. 11).

Location information may take different forms. In some embodiments, wireless devices may have GPS capabilities, and these devices may transmit GPS location coordinates along with requests for data. When such GPS location information is received, it may be stored in the database 500. For example, as shown, the data requests associated with wireless communications 231A, 231B, 231C, 240, 243 and 246 all have GPS location information stored in the database 500. In some embodiments, location of wireless devices may be determined even when the wireless device is not equipped with GPS functionality. Wireless devices may receive signals from several different wireless towers. The devices may transmit a time of arrival for a synchronized signal from each tower. From the time-of-arrival transmissions, the wireless service provider may be able to calculate a relatively precise location using, for example, a technique such as Advanced Forward Link Trilateration (AFLT). The location—whether a GPS location, an AFLT location, or a location determined in some other manner—may be assigned to a Region 513. The Region 513 may be used as a reference point for data storage and analysis, as was described with reference to FIG. 2B. A less accurate indicator of location may simply depend on the cell tower or access point that is serving a communication, or the user may self-report their location.

Identification of the wireless service provider from whose network the data request originated is stored in the database 500 in the Wireless Service Provider 516 field. This information may be used to identify data points that correspond to a particular network. From these data points, a system may generate location-time assessments of quality for a particular network (see FIG. 9). Information about the Wireless Service Provider 316 may also be used to compare one wireless service provider with another at a particular time or location (see FIGS. 10 and 11).

The specific model of wireless device is also stored in the database table 500. This information may be used to compare quality of particular wireless devices. For example, the communications 237 and 240 occurred at roughly the same time and from nearby locations. If quality of the actual signal from the closest wireless tower is assumed to be relatively fixed, the wireless device itself may impact the inferred quality of the wireless service at the location from which the data request was made. For example, differences in fulfillment of data requests at different wireless devices, as evidenced by retries or dropped wireless communications, may point to differences in the wireless devices themselves. More particularly, the fact that the data request took three retries to be fulfilled for communication 240 when the data request was fulfilled without any retries for communication 237 may imply that the wireless devices themselves are of different quality. Conclusions about quality of wireless devices may be drawn relative to a "baseline" for the locations corresponding to wireless devices under comparison. For example, analysis of a large number of data points near the locations associated with communications 237 and 240 around 09:15 A.M. may indicate that network 216 generally provides a high quality wireless service. The fact that the specific wireless device that initiated communication 240 required three retries for the data request to be fulfilled may imply that the quality of the wireless device itself is of lower-than-average quality.

While the data in database 500 and elsewhere in this document is shown in a particular format to assist in understanding a system and its operation, in actual application, the data may taken many different forms and be stored in appropriate manners. For example, the various data may be stored across multiple relational databases or database components. In addition, the data may take a non-readable form, such as to reduce the amount of storage spaced required for the data. In addition, the data may be pre-processed in various manners.

For example, multiple data entries may be combined into a single entry, such as to reduce errors in the data or reduce the size of the data. As one example, where a mobile device is constantly transmitting useful information, the information may be stored as discrete averaged information for discrete periods that are longer in length than the periods at which the device is providing data.

Figure 8:
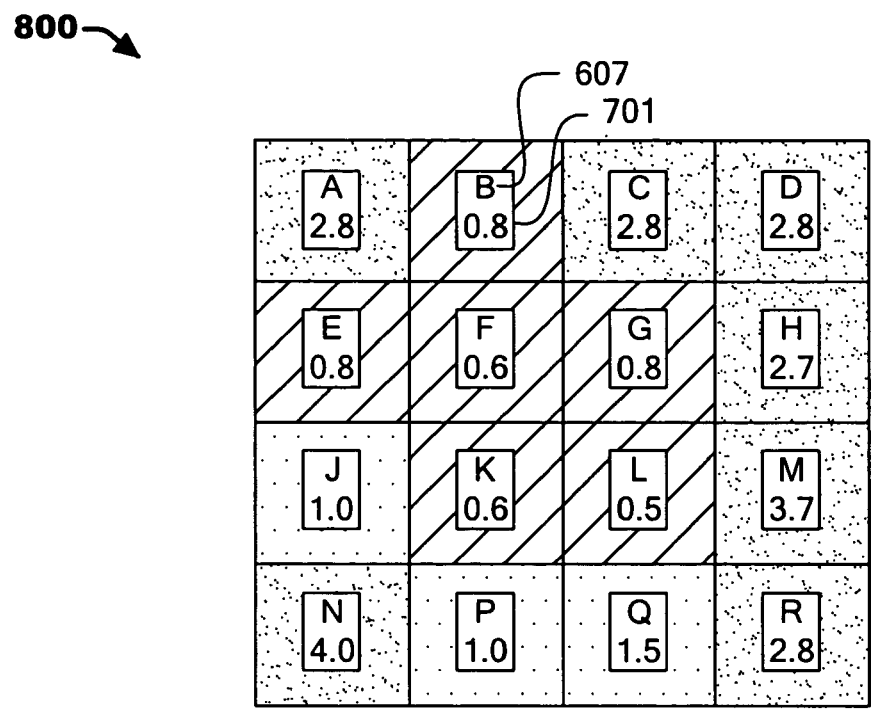
FIG. 8 is a graphical representation of average scores associated with the regions that are shown in FIGS. 7A and 7B.

FIGS. 6-8 illustrate how a set of data points may be analyzed, for example by an information provider, according to some embodiments. FIGS. 6A and 6B are, together, a table showing entries in another exemplary database 600. As shown, the database 600 includes data associated with sixteen regions (labeled A-H, J-N, and P-R in a Region Field 604). The database 600 may have been extracted from a larger database like the database 500 that is shown in FIG. 5. For example, the database 600 may only include data points (database rows) that correspond to one wireless service provider, within a particular period of time in the day and within particular locations. The Regions entries 604, for example, may be sub-regions of the region 225E that is shown in FIGS. 2B and 5, and the Region entries 604 may have been determined from GPS coordinates, such as the GPS coordinates 510.

Each data point in the database 600 includes a Communication ID 601 that may be used during analysis to distinguish one data point from another. Each data point also includes a number of Retries 607, if any, associated with the data point and another number, 1 or 0, that represents whether that particular wireless communication was dropped (610) or not, respectively. A Score 613 is also shown in the database 600. The Score 613 could be related to the number of Retries 607 and the Dropped 610 field, or to another indicator of network quality or data transmission quality. The Score 613 may permit an inference to be drawn on the signal quality at the corresponding Region 604 for a particular wireless communication. As shown, the Score 613 is equal to the number of Retries 604 plus three if the wireless communication was dropped, or zero if it was not dropped. In this manner, the exemplary Score 613 weights a drop more heavily than a single retry. In other embodiments, the Score 613 may be calculated in another manner.

FIGS. 7A and 7B are, together, a diagram 700 illustrating the data points that are shown in FIGS. 6A and 6B, distributed by region from which they originated. Each wireless communication in the list includes the Communication ID 601, the number of Retries 607, whether the wireless communication was Dropped 610 and the Score 613. FIG. 7 further shows an average score value 701. The average score 701 may be calculated as a running average, or it could be calculated after a snapshot of the database 600 is captured and processed. As shown, the average score 701 is a simple average of the Scores 613. In some embodiments, the average score 701 could be weighted based on the number of wireless communications from which it is calculated. In some embodiments, the average score 701 may not be calculated until a threshold number of wireless communications for a particular region has been received.

FIG. 8 is a graphical representation 800 of the average scores 701 that are shown in the diagram 700. As shown, a unique pattern 801A, 801B or 801C is applied to each region. The pattern is selected based on which of the ranges (0.0-0.9, 1.0-1.5, or 1.6<) encompasses the average score 701 of the region. For example, since the average score associated with region F is 0.6, pattern 801A is applied to region F in the representation 800. Region M has a higher average score, so pattern 801C is applied to region M in the representation 800. As a result, the representation 800 graphically depicts inferred differences in signal quality. Given how the scores 613 and 701 are calculated in the foregoing example, lower scores are associated with fewer retries and drops. Thus, in the example, higher signal quality may be inferred from lower scores than from higher scores. From the representation 800, one can infer that signal quality is highest in regions B, E, F, G, K and L. Wireless service providers may use such information to assess and improve performance. Consumers may use this information to select a wireless service provider.

While the scores are shown graphically in FIG. 8 as applying to square areas, the representation of network quality may be varied. For example differences between and among zones can be smoothed at the edges, such as is done for graphics antialiasing, to provide a representation that more accurately reflects the gradually changing nature of the network quality. Also, other representations may be provided, such as lines that draw circles of coverage quality, much like rings on a topographic map. Colors may also be used to convey information. In addition, color may be used to convey network quality, while the density of dots in an areas may be reflective of the number of data points for that area so that more-completely filled areas represent areas in which there is more confidence that the data reflect an accurate picture of the true network quality. Where the number of data points is too low to permit an acceptable level of confidence, an appropriate indicator may be shown.

In FIGS. 7A, 7B and 8, only sixteen regions are illustrated. However, many embodiments will include more than sixteen regions. In some embodiments, the size of each region may affect the granularity of inferences that may be drawn from data originating from the region. For example, analysis of data from a large region may be analyzed to identify very large "dead zones" of poor wireless signal quality. Analysis of data in a very large region along a highway may identify a half-mile dead zone associated with a particular wireless service provider. In contrast, analysis of data from a very small region may pinpoint a very small dead zone, such as, for example, a 30-foot stretch of sidewalk next to a particular office building in a central business district of a large city.

Figure 10:
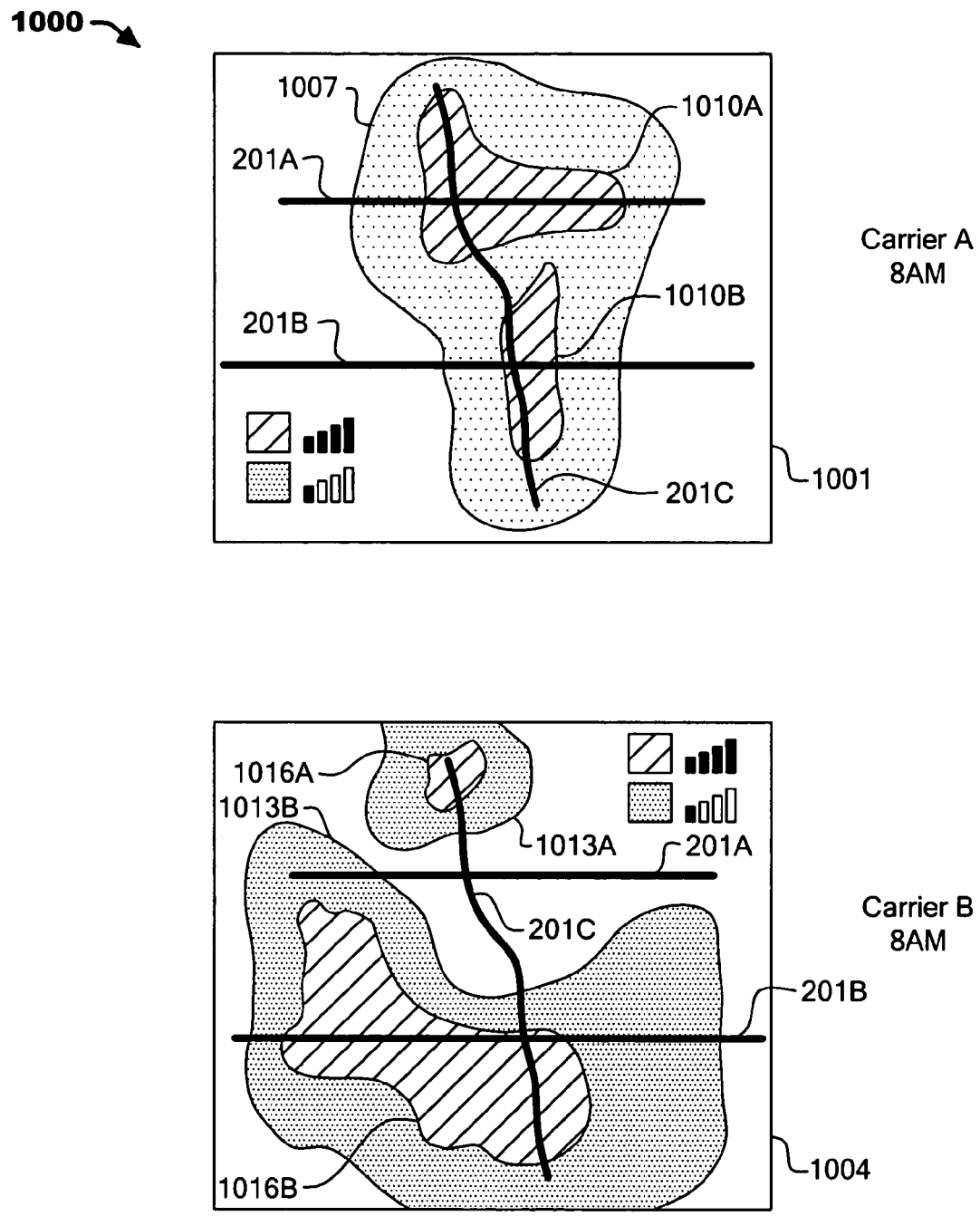
FIG. 10 is an exemplary report that includes a series of maps that may compare quality of coverage of two or more wireless service providers.
Figure 11:
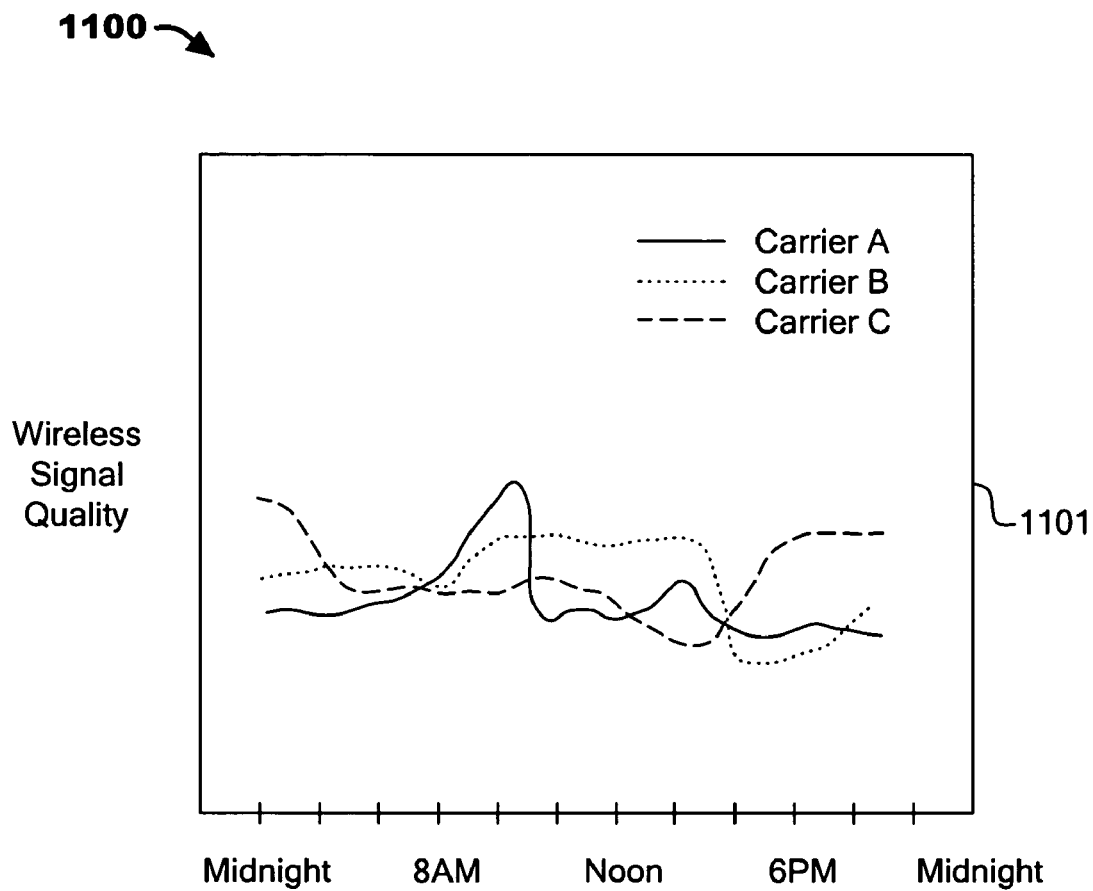
FIG. 11 is an exemplary report that includes a graph that may compare coverage of two or more wireless service providers as a function of time.

In addition to graphical representations like the graphical representation 800, numerous other kinds of reports may be generated. The reports may summarize quality associated with one or more wireless networks graphically. For example, a report may comprise a map or a series of maps (e.g., in the form of an animation or animations) depicting coverage of a particular wireless service provider as a function of location or time, as illustrated by FIG. 9. As another example, a report may comprise one or more maps that compare quality of coverage of one or more wireless service providers at a particular time, as illustrated by FIG. 10. As another example, a report may comprise a graph comparing quality of several wireless carriers at a particular location as a function of time, as illustrated by FIG. 11.

As illustrated in FIG. 9, a report 900 may comprise a series of maps 901, 904 and 907 that characterize wireless signal quality associated with a particular wireless provider. Each map may correspond to a particular time period, and different levels of signal quality corresponding to different regions may be depicted within the time period. For example, in the map 901, a region 910A may have high signal quality, while regions 913A and 916A may have low signal quality. Quality characterization may be inferred from a large number of wireless communications. Based on analysis of, for example, hundreds or thousands of wireless communications around 08:00 A.M. on many different days, the region 910A may correspond to a subset of the wireless communications with locations within the region 910A and originating from a particular wireless service provider. Overall, these wireless communications may rarely require retries or rarely be dropped.

Thus, a high average signal quality may be inferred for this region 910A. Similarly, the regions 913A and 916A may correspond to many wireless communications that require retries or that are dropped. Thus, a low average signal quality may be inferred for these regions 913A and 916A. Inferences of low signal quality may support other inferences, such as inferences about network congestion, bandwidth or capacity at particular times of the day. Other maps or reports may be provided to illustrate such inferences.

The maps 904 and 907 may be generated in a similar manner—from hundreds or thousands (or more) of data points corresponding to hundreds or thousands (or more) of wireless communications at other times of the day. In addition to the static maps 901, 904 and 907, more continuous representations of wireless signal quality could be generated. For example, many maps may be generated for many different times throughout the day, and one or more animations may be generated from the many different maps. Data may also be interpolated as needed to smooth out the animation.

A wireless service provider may use this information to improve its wireless service network. For example, it may be desirable for a wireless service provider to vary its coverage over a particular area throughout the day. Rather than adding wireless towers to vary coverage, the wireless service provider may adjust the antennae on existing wireless towers to focus coverage in a particular direction. For example, a wireless service provider may wish to adjust antennae along a major highway to ensure good coverage from the highway during peak commute times. However, such an adjustment may have the effect of lowering the quality of coverage in an adjoining residential neighborhood. Faced with this tradeoff, the wireless service provider may use data compiled from an information provider to assess the volume and locations wireless services requests. In such a situation, adjustments may be made using historical data or even real-time data, particularly in heavily traveled areas.

As illustrated in FIG. 10, a report 1000 may comprise a series of maps 1001 and 1004 that each characterize wireless signal quality associated with particular wireless providers. The maps 1001 and 1004 may facilitate comparisons between wireless carriers for particular regions at a particular time. For example, at 08:00 A.M., Carrier A may have strong wireless coverage in regions 1010A and 1010B, but coverage may be of lower quality in region 1007. At the same time, Carrier B may have strong wireless coverage in regions 1016A and 1016B, but lower-quality coverage in regions 1013A and 1013B. A wireless customer interested in wireless services during, for example, a morning commute, may use the maps 1001 and 1004 to select the carrier with the best coverage available for the intended area of travel. If the customer typically travels north or south along the highway 201C during the morning commute, that customer may select Carrier A. In contrast, a customer that typically travels east or west along the highway 201B may select Carrier B.

The user may also provide, or be provided with, a quality along that route from point A to point B, where point A is shown on the left of the graph point B on the right, a quality as one or more (for multiple carriers) line graphs in between. Landmarks on the trip may also be indicated before points A and B. A wireless service provider may use the maps 1001 and 1004 for strategic planning purposes. For example, Carrier B may plan future wireless tower sites to capture more of the wireless service market among morning commuters along the highway 201C.

As illustrated in FIG. 11, a report 1100 may display information similar to the information shown by the maps 1001 and 1004 as a graph 1101. Rather than showing quality as a function of location at a particular time, the graph 1101 may be well suited for showing quality at a specific location as a function of time. A wireless customer whose wireless service needs are generally focused on that location could use such a graph 1101 to select a wireless service provider that provides the best coverage over time. A wireless service provider could use the graph 1101 to strategically improve coverage at particular times.

Other appropriate reports, whether graphical or not, may also be generated using the stored data. For example, a user experiencing quality problems with a wireless device may submit a request with the device (such as by pressing a key on the device or selecting an icon on the screen of the device), which may trigger a central system having access to data on network quality in particular locations to generate a visual or aural instruction telling the user which way to move for better coverage. In addition, an organization wishing to purchase time or bandwidth on the physical networks of various wireless carriers may also use the data to generate reports and recommendations about which carriers have the best coverage in particular areas and at particular times. Such an organization may then piece together access agreements that allow for the best coverage at the best costs.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. The systems and methods described herein may be implemented in many different wireless networks, including by way of example, cellular voice networks; wide area wireless networks such as TDMA, CDMA, W-CDMA, GSM, satellite-based, or EDGE networks; metro area networks such as WiMAX networks; local area networks such as WiFi networks; and any other wireless networks that can deliver voice, data, information, gaming applications, business or utility applications, or other services over a large or small geographical area. Also, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method of providing information indicative of network performance by one or more wireless service providers in a geographic area, comprising:
    at an information provider a) receiving, via one or more wireless service provider networks, a plurality of requests for information from a corresponding plurality of end-user wireless devices; b) obtaining information that is responsive to the plurality of requests; and c) providing the information that is responsive to the plurality of requests to the one or more wireless service provider networks for delivery to the corresponding plurality of end-user wireless devices;
    determining, at the information provider, based on two or more of the plurality of requests, performance indicators associated with the one or more wireless service provider networks from which the two or more of the plurality of requests were received;
    correlating the performance indicators with one or more network service areas, and aggregating related performance indicators to produce one or more aggregated performance indicators; and
    producing from the one or more aggregated performance indicators a human-discernible representation of network performance for the one or more network service areas.

2. The method of claim 1, wherein at least one of the plurality of end-user wireless devices comprises a wireless personal digital assistant.

3. The method of claim 1, wherein the information provider is not affiliated with the one or more wireless service providers networks.

4. The method of claim 1, wherein the information provider is selected from the group consisting of a wireless service provider, a cellular telephone service provider, a data provider, and an application provider.

5. The method of claim 1, further comprising obtaining location information associated with at least one of the wireless devices in the plurality of end-user wireless devices.

6. The method of claim 5, wherein the location information comprises GPS location information.

7. The method of claim 6, wherein the GPS location information is predicted based on previously received heading, speed and GPS location of a wireless device.

8. The method of claim 6, wherein the GPS location information is extracted from an HTTP request received by the information provider.

9. The method of claim 5, wherein the representation of network performance comprises a map showing quality of coverage for a wireless service provider over a geographic area.

10. The method of claim 5, wherein the representation of network performance comprises an animation of quality of coverage for a wireless service provider over a geographic area and over time.

11. The method of claim 5, wherein the representation of network performance comprises a graph of quality of coverage over time for a particular geographic location.

12. The method of claim 5, wherein the representation of network performance compares quality of coverage of two or more wireless service provider networks relative to a time of day or a location.

13. The method of claim 5, wherein the representation of network performance compares reliability of two or more models of wireless devices.

14. The method of claim 5, further comprising generating instructions for improving performance of the at least one wireless device, and sending the instructions to the at least one wireless device.

15. The method of claim 14, wherein the instructions comprise a direction the at least one wireless device should be moved to improve performance.

16. The method of claim 5, wherein the location information comprises location information obtained through a technique selected from the group consisting of terrestrial triangulation and cell identification.

17. The method of claim 5, wherein the location information is received from a wireless device in the plurality of end-user wireless devices, and wherein the location information is selected from the group consisting of a particular physical location, a zip code, an intersection of two or more roads, and a location-specific query.

18. A system for providing information indicative of network performance by one or more wireless service providers over a geographic area, the system comprising:
    a service performance monitor coupled to an information provider, wherein the information provider a) receives, via one or more wireless service provider networks, a plurality of requests for information from a corresponding plurality of end-user wireless devices; b) obtains information that is responsive to the plurality of requests; and c) provides the information that is responsive to the plurality of requests to the one or more wireless service provider networks for delivery to the corresponding plurality of end-user wireless devices; and wherein the service performance monitor obtains performance indicators associated with the plurality of requests for information received by the information provider from the plurality of end-user wireless devices or with the obtained information that is responsive to the plurality of requests;

a performance correlator that correlates the performance indicators with one or more network service areas, and aggregates related performance indicators to produce one or more aggregated performance indicators; and a report generator that produces from the one or more aggregated performance indicators a representation of network performance for the one or more network service areas.

19. A system for providing information indicative of network performance by one or more wireless service providers over a geographic area, the system comprising:

an information provider that a) receives, via one or more wireless service provider networks, a plurality of requests for information from a corresponding plurality of end-user wireless devices; b) obtains information that is responsive to the plurality of requests; and c) provides the information that is responsive to the plurality of requests to the one or more wireless service provider networks for delivery to the corresponding plurality of end-user wireless devices;

a means for obtaining performance indicators associated with the plurality of requests for information received by the information provider;

a performance correlator that correlates the performance indicators with one or more network service areas, and aggregates related performance indicators to produce one or more aggregated performance indicators; and a report generator that produces from the one or more aggregated performance indicators a text or pictorial representation of network performance for the one or more network service areas.

20. A method of providing information indicative of network performance by one or more wireless service providers in a geographic area, comprising:

at an information provider, a) receiving, via one or more wireless service provider networks, a plurality of requests for information from a corresponding plurality of end-user wireless devices; b) obtaining information that is responsive to the plurality of requests; c) providing the information that is responsive to the plurality of requests to the one or more wireless service provider networks for delivery to the corresponding plurality of end-user wireless devices; and d) receiving confirmations that the information that is responsive to the plurality of requests has been delivered to the corresponding plurality of end-user wireless devices;

determining, at the information provider, based on whether confirmations have been received that information that is responsive to requests in the plurality of requests has been delivered to corresponding end-user wireless devices in the plurality of end-user wireless devices, performance indicators associated with the one or more wireless service provider networks;

correlating the performance indicators with one or more network service areas, and aggregating related performance indicators to produce one or more aggregated performance indicators; and producing from the one or more aggregated performance indicators a human-discernible representation of network performance for the one or more network service areas.

21. The method of claim 1, wherein the information provider comprises a centralized information provider that receives requests for information from the plurality of end-user wireless devices through a plurality of different types of networks.

22. The method of claim 1, wherein the information provider and the plurality of end-user wireless devices are separated by a public network.

23. The method of claim 22, wherein the public network comprises the Internet.

24. The method of claim 1, wherein the requests for information include search queries submitted to a search engine.

25. The method of claim 1, wherein the requests for information are not made for purposes of network performance monitoring.

\* \* \* \* \*